Figure 1:
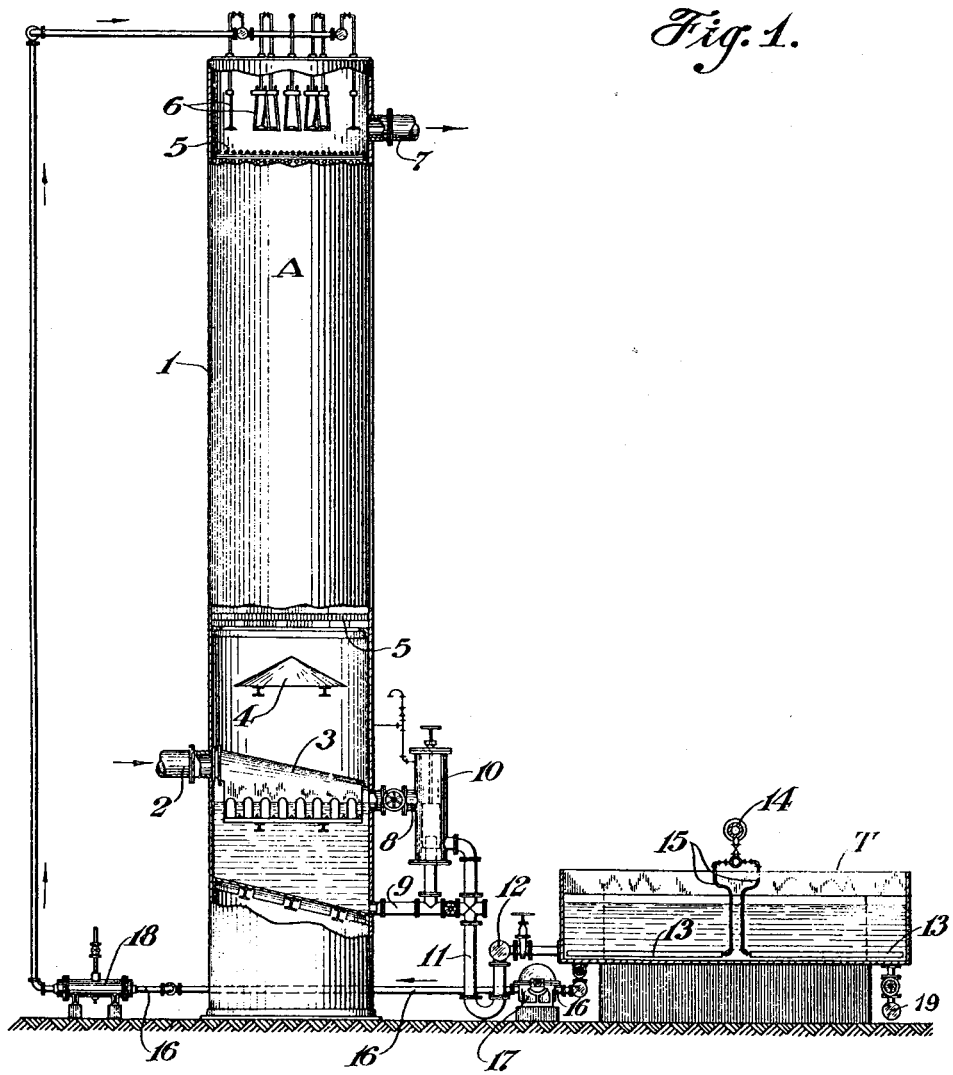

Jan. 19, 1932.   F. W. SPERR, JR   1,841,419
GAS PURIFICATION PROCESS
Filed July 24, 1926   2 Sheets-Sheet 2

INVENTOR
Frederick W. Sperr Jr.
BY
Jesse R. Langley
ATTORNEY

Patented Jan. 19, 1932

1,841,419

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

GAS PURIFICATION PROCESS

Application filed July 24, 1926. Serial No. 124,556.

This invention relates to the removal of hydrogen sulphide, hydrogen cyanide and analogous impurities from fuel gas, especially those containing relatively small quantities of such impurities.

The invention relates more particularly to a method of treating the sulphide-laden alkaline solutions previously used to absorb impurities from the gas. It may also be applied to the treatment of other alkaline solutions containing sulphides, such, for example, as those produced in certain processes for the manufacture of artificial silk.

An object of my invention is to effect purification of fuel gas at minimum expense and with the employment of more simple apparatus and methods than have heretofore been possible, at the same time avoiding the contamination of the surrounding air with noxious gas.

Further objects of my invention are to avoid the liberation of sulphur as such, with the attendant operations necessary for its preparation as a saleable product, and to convert the hydrogen sulphide into soluble salts, e. g., sodium thiosulphate and thiocyanate, which may readily be accumulated and recovered for commercial utilization, if desired.

My invention consists in such other improvements and has, for further objects, such other operative advantages or results as may be found to obtain in the processes hereinafter described or claimed.

I have discovered that, in cyclic processes for gas purification involving the circulation of an alkaline solution through an absorption and an actification stage, proper conditions and the presence of certain substances in minute quantity will cause substantially all the hydrogen sulphide and hydrogen cyanide absorbed from the gas by the alkaline liquid to ultimately combine with the alkali in this liquid in the form of thiosulphate or thiocyanate. Furthermore, under these conditions, free sulphur does not accumulate in such quantity as to require removal.

The use of an iron compound dissolved or suspended in an alkaline solution which is circulated over the gas and then aerated for the production and removal of free sulphur has been described in U. S. Letters Patent No. 1,525,140, to Robert Mann and Mathew Lebo. The use of nickel sulphide as a catalyst for the direct reaction between oxygen and hydrogen sulphide dissolved in an alkaline solution is described in the copending application of Willis S. Yard et al., Serial No. 743,049, filed Oct. 11, 1924. When iron compounds are used, relatively large amounts must be employed in order to obtain the maximum production of free sulphur. When nickel sulphide is employed, very much smaller amounts of this substance are effectively used for the same purpose, the substance behaving as a true catalyst. The same statement is also true of cobalt sulphide. When hydrocyanic acid is present in the gas and iron compounds are used in processes of this type for the conversion of hydrogen sulphide to free sulphur, substantially all of this hydrocyanic acid is converted to sodium thiocyanate. The same is true in systems employing cobalt as a catalyst. When a nickel compound is used, however, the hydrocyanic acid converts this into sodium nickel cyanide. Any excess hydrocyanic acid remaining after this reaction goes largely to the formation of sodium thiocyanate.

I have discovered that smaller amounts of iron and much smaller amounts of nickel and cobalt, when present in the alkaline gas purification liquid, act as catalysts to favor the formation of thiosulphate and with proper reduction of the amounts of these substances used, it is possible to convert substantially all of the hydrogen sulphide into thiosulphate. For example, when using iron compounds in the treatment of gas containing 150 grains of hydrogen sulphide per 100 cu. ft., for the conversion of this impurity to thiosulphate, my circulating liquid contains less than the equivalent of 0.1% of $Fe_2O_3$; and as little as 0.01% of $Fe_2O_3$ is effective. When using cobalt or nickel compounds in treating the same gas, still smaller amounts are employed. In the case of one plant where this process has been in operation, the amount of nickel added to the system is very slightly more than what is required to form sodium nickel cyanide through reaction with the small amount of hydrocyanic acid present in the gas. How slight an amount of catalyst is required is shown by the fact that analyses at this plant fail to detect the presence of nickel in any form other than this double cyanide. In some instances, there has been enough catalytic effect through iron rust in the apparatus, or iron compounds in the water, or possibly even through impurities in the soda ash itself, to convert a larger proportion of hydrogen sulphide to thiosulphate and thiocyanate than with the employment of a soda ash solution alone.

In general, it may be stated that compounds of the essentially divalent elements of the eighth group of the periodic system are effective in promoting the oxidation of sulphides present in alkaline solution. Used in relatively large amounts, such compounds promote the liberation of free sulphur and the regeneration of the original alkaline compounds, in addition to having a catalytic effect upon the formation of alkaline thiosulphate. As compared with compounds of other metals in this classification, the amounts necessary to effect the liberation of free sulphur, the character of the effect, (i. e., whether catalytic or stoichiometric) and the susceptibility to side reactions, the characteristics of the compounds of any one of these metals may differ considerably. Of all, however, it is true that when present in diminished amount, the effect of substantially liberating sulphur ceases, while the promotion of thiosulphate formation continues. Sulphur may theoretically be formed in the process, but is not substantially liberated as such, and is immediately consumed in the formation of thiosulphate and/or thiocyanate.

I have also discovered that, in the presence of these thiosulphate catalysts in proper amounts, a relatively high alkalinity, for example, of over 2% and the maintenance of a relatively high temperature, for example, over 80° F. are conditions which favor the formation of thiosulphate and discourage the liberation of sulphur. Any condition favorable to the production of a sulphur foam is preferably to be avoided and for this reason small amounts of anti-foam agents, for example, water gas tar oils, may be added to the circulating liquid. Excessive aeration is preferably avoided.

It is well known that, when gas containing hydrogen sulphide and hydrogen cyanide comes into contact with a sodium carbonate solution, these impurities are absorbed by the solution, with the formation of soluble sodium hydro-sulphide (NaHS) and sodium cyanide (NaCN).

Prior processes for actifying fouled solutions of this character have depended upon reversing the reactions incident to the formation of these compounds by removing the impurities from the solution in gaseous form in a current of air, or upon causing free sulphur to be liberated in solid form, under the influence of an iron compound or other agent. The incidental formation of thiosulphate, due to side reactions in such processes, has been small in the presence of the relatively large amounts of iron compound or other agent generally required in sulphur recovery processes, and has generally been regarded as more or less of an undesirable result. When feasible, it has generally been attempted to reduce such formation to as low an amount as possible.

In my invention, I employ conditions favorable to the formation of thiosulphate as end products. In the oxidation of sodium hydrosulphide, it is probable that, if the solution were absolutely pure, no reaction would take place between this substance and oxygen. However, in the presence of minute amounts of catalysts and under the proper conditions, as recited above, a reaction takes place which may be indicated generally as follows:

(1)    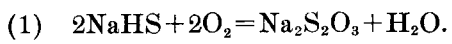 $2NaHS + 2O_2 = Na_2S_2O_3 + H_2O$.

The exact nature of the reactions taking place is exceedingly difficult to determine and practically any theory which has yet been advanced is incapable of proof and subject to criticism. However, it is probable that, in my process, nascent sulphur liberated in the oxidation of sodium hydrosulphide immediately dissolves in the latter, with formation of a sulphide of sodium, and that this sulphide is then oxidized to sodium thiosulphate. It is also probable that the dissolved or nascent sulphur reacts with the sodium cyanide, forming sodium thiocyanate, which is known to be an end product of my process.

It will be seen, from an inspection of molecular weights, that a ratio of one part of hydrogen sulphide removed from the gas to 1.56 parts of soda consumed is maintained, regardless of the ratio of thiosulphate to thiocyanate in the end product.

A difference between my present invention and most prior gas purification processes will be seen in that such prior processes effected a regeneration of the great part of the alkali present in the solution, whereas in my invention, the alkali is gradually consumed in the formation of the end products herein recited. Such a process is especially economical in the purification of low sulphur gas, as the quantities of sulphur produced by prior processes for treating such gas are occasionally too small to make refining and recovery of a saleable sulphur product feasible.

It will be seen, from the foregoing, that my invention differs fundamentally from the prior art in two respects, first, in that the liberation of free sulphur, or of hydrogen sulphide, from the fouled solution, is avoided;

and, second, in that no regeneration of the original alkali is effected.

In my process, a metallic compound is present in such small amount as to be ineffective, catalytically or stoichiometrically, in the liberation of free sulphur, but nevertheless in amount sufficient to serve as catalyst for the conversion of the alkali to thiosulphate.

Economically considered, especially in the treatment of low sulphur gas, my process is advantageous in that it avoids the flotation, separation and disposal of sulphur, and in that the consumption of the alkali results in the formation of a particularly advantageous and valuable end product.

Figure 2:
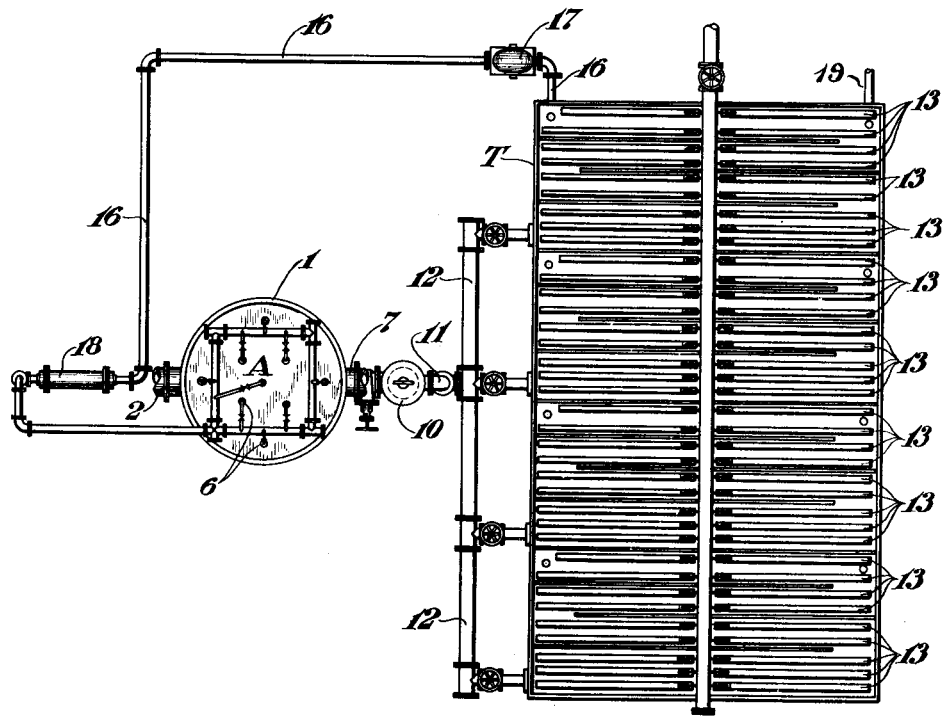

In order that my invention may be clearly set forth and understood, I now describe, with reference to the accompanying drawings which show a preferred embodiment of my invention, the preferred manner in which it is practiced. In these drawings, Figure 1 is an elevational view of apparatus for gas purification, including means for absorption stage and an oxidation stage, parts being broken away; and Fig. 2 is a plan view of the apparatus shown in Fig. 1.

Similar characters of reference designate the same parts in each of the views of the drawings.

With reference to the drawings, an absorption tower A is comprised of a vertical cylindrical shell 1, for the purpose of effecting contact between gas to be purified and an alkaline absorbent solution. The gas enters the lower portion of the absorber A through an inlet pipe 2 and a saturator bell 3 and passes under a plurality of serrations in the lower edges of the saturator bell 3 into a body of the liquid maintained in the absorber A. A portion of the impurities contained by the gas are removed in this initial contact and the partially purified gas, after emerging from the liquid, passes upward through the absorber A past a deflector 4 and rises through permeable contact means 5 in countercurrent with a downwardly moving and relatively uncontaminated alkaline absorbent solution introduced through a plurality of sprays 6. The permeable contact means 5 may be any of the forms well-known in the art. The gas reaches the upper portion of the absorber A in substantially completely purified condition and escapes through an outlet 7. The alkaline solution collects in a fouled state in the lower portion of the absorber A and passes through conduits 8 and 9 into a saturator-seal-regulating device 10; thence it flows through a conduit 11 under the action of gravity and enters a header 12, from which it is distributed, as desired, to the various compartments of an oxidizing chamber or thionizer T.

The thionizer T is an open tank consisting of a plurality of similar compartments, each of which is provided with a plurality of air-diffusion means 13 adjacent to the bottom thereof, and appropriate baffles for causing a tortuous flow of the solution past such means.

Compressed air is delivered by a header 14 and supply pipes 15 to the air-diffusion means or aerators 13. This air passes through the aerators 13 to emerge in exceedingly finely comminuted form in the body of liquid maintained within the thionizer T and effects an efficient oxidation of this solution. The refreshed solution is withdrawn from the thionizer T to a conduit 16 by a pump 17 and forced through a solution heater 18 and the plurality of sprays 6 into the interior of the absorber A, thus completing the cycle.

The solution heater 18 is supplied with sufficient steam to maintain the solution entering the absorber A at a temperature of over 80° F.

Sufficient alkali is added to the solution in the thionizer T to maintain a total alkalinity of over 2% in the solution and, when necessary, additions are also made of cobalt compound or other catalyst in quantity sufficient to promote the formation of thiosulphate and thiocyanate without causing the substantial liberation of sulphur. The appearance of a sulphur foam is generally an indication that an excess of catalyst is present and subsequent additions of catalyst should not be made until after this sulphur has disappeared.

The concentration of thiosulphate and thiocyanate in the solution will rise according to the sulphur content and amount of the gas purified. When the total quantity of dissolved salts reaches a concentration of 20 to 30 grams per 100 cc., a portion of the solution is withdrawn from the system through the conduit 19 and replaced by an appropriate quantity of water and as much alkali and/or catalyst as may be necessary.

In treating gas, such as ordinary carburetted water gas, containing less than 100 grains $H_2S$ per 100 cu. ft., the cost of my process has been found to be so low that the thiosulphate and thiocyanate liquor may generally be discarded without an attempt to recover these materials therefrom. However, these materials may always be recovered when it is advantageous to do so. An excellent means of accomplishing this recovery is described and claimed in the copending application of Ralph E. Hall and David L. Jacobson, Serial No. 462,136, filed April 18, 1921.

My process presents a simple and inexpensive means for purifying fuel gases, avoiding on the one hand, liberation of noxious gas into the atmosphere, and, on the other hand, the necessity for dealing with quantities of sulphur or sulphur froth. In the absence of sulphur liberation, the usual operations, as well as the apparatus, necessary to the removal and preparation of the same, are eliminated.

A further advantage of my present invention resides in the fact that the entrainment of valuable and active catalyst in the sulphur removed in the operation of prior processes of gas purification, is avoided. My process may also, as hereinabove recited, be applied to the treatment of alkaline solutions containing sulphides, other than those incidental to gas purification processes. To illustrate the utility of my invention in this respect, it can be applied to the fixation of sulphides present in alkaline solutions common to the artificial silk industry, and ordinarily regarded by the latter as undesirable waste. My means of my process, sulphides present in such or other alkaline solutions may be converted to sodium thiosulphate, a valuable product.

My invention has herein been described with reference to a particular form and embodiment but is not limited to such form or embodiment and may be variously embodied within the scope of the following claims.

I claim as my invention:

1. The process of purifying a gas from hydrogen sulphide which comprises recirculating over the gas and through an aeration stage an alkaline absorbent liquid containing a catalyst present in said liquid in amount sufficient to prevent the liberation of hydrogen sulphide in said aeration stage and to promote the conversion of absorbed sulphide substantially entirely to stable fixed thiocompounds but insufficient to cause the liberation of elemental sulphur.

2. The process of treating an alkaline sulphide solution which comprises aerating the solution in the presence of a catalyst present in the solution in amount sufficient to prevent the liberation of hydrogen sulphide in said aeration stage and to promote the conversion of absorbed sulphide substantially entirely to stable fixed thiocompounds but insufficient to cause the liberation of elemental sulphur.

3. In the process of purifying a gas from hydrogen sulphide and hydrogen cyanide by treating the gas with an alkaline absorbent solution, the step which comprises aerating said solution in the presence of less than 0.1 percent of a compound of a metal of the group consisting of iron, nickel and cobalt to convert said impurities to alkali thiosulphate and thiocyanate substantially without the liberation of free sulphur.

4. In the process of purifying a gas from hydrogen sulphide and hydrogen cyanide by treating the gas with an alkaline absorbent solution, the step which comprises aerating said solution in the presence of less than 0.1 percent of a nickel compound to convert said impurities to alkali thiosulphate and thiocyanate substantially without the liberation of free sulphur.

5. In the process of purifying a gas from hydrogen sulphide and hydrogen cyanide by treating the gas with an alkaline absorbent solution, the step which comprises aerating said solution in the presence of less than 0.1 percent of an iron compound to convert said impurities to alkali thiosulphate and thiocyanate substantially without the liberation of free sulphur.

6. In the treatment of alkaline sulphide solution, the step which comprises aerating the solution in the presence of a compound of a metal of the group consisting of iron, nickel and cobalt, present in amount sufficient to prevent the liberation of hydrogen sulphide but insufficient to cause the liberation of free sulphur.

7. In the treatment of alkaline sulphide solution, the step which comprises aerating the solution in the presence of a compound or iron, present in amount sufficient to prevent the liberation of hydrogen sulphide but insufficient to cause the liberation of free sulphur.

8. In the treatment of alkaline sulphide solution, the step which comprises aerating the solution in the presence of a compound of nickel, present in amount sufficient to prevent the liberation of hydrogen sulphide but insufficient to cause the liberation of free sulphur.

9. In the treatment of alkaline sulphide solution, the step which comprises aerating the solution in the presence of a compound of cobalt, present in amount sufficient to prevent the liberation of hydrogen sulphide but insufficient to cause the liberation of free sulphur.

10. The process of converting sulphide in alkaline solution to thiosulphate which comprises subjecting the same to an oxidizing environment in the presence of less than 0.1% of a compound of a metal of the group consisting or iron, nickel and cobalt.

11. In the process of purifying a gas from hydrogen sulphide and hydrogen cyanide by treating the gas with an alkaline absorbent solution, the step which comprises aerating said solution in the presence of less than 0.1 per cent of a cobalt compound to convert said impurities to alkali thiosulphate and thiocyanate substantially without the liberation of free sulphur.

12. The process of removing hydrogen sulphide and hydrogen cyanide from gas which comprises washing the gas with a solution of from 2 to 2.5 per cent of sodium carbonate and containing up to 0.1 per cent of a compound of a catalyst effective in causing the conversion of said impurities after absorption by said solution and in an oxiding environment to alkali thiosulphate and thiocyanate, removing said solution from said gas and causing it to be subjected to the influence of air in a finely comminuted state.

13. The process of removing hydrogen sulphide and hydrogen cyanide from gas which comprises washing the gas with a solution of from 2 to 2.5 per cent of sodium carbonate and containing a compound of a metal of the group consisting of iron, nickel and cobalt in an amount less than that sufficient to cause the liberation of free sulphur in substantial amount, removing said solution for aeration and returning it to contact with fresh quantities of gas.

In testimony whereof, I have hereunto subscribed my name this 23rd day of July, 1926.

FREDERICK W. SPERR, Jr.